United States Patent [19]

Okada et al.

[11] 4,177,769

[45] Dec. 11, 1979

[54] COMBUSTION CHAMBER FOR AN INTERNAL COMBUSTION ENGINE OF DIRECT INJECTION TYPE

[75] Inventors: Masaru Okada; Seikichi Kanai, both of Oyama, Japan

[73] Assignee: Kabushiki Kaisha Komatsu Seisakusho, Tokyo, Japan

[21] Appl. No.: 843,229

[22] Filed: Oct. 18, 1977

[30] Foreign Application Priority Data

Oct. 18, 1976 [JP] Japan ............................ 51/138872

[51] Int. Cl.² ............................................ F02B 23/06
[52] U.S. Cl. .............................. 123/30 D; 123/32 A; 123/193 P
[58] Field of Search ............... 123/30 C, 30 D, 32 A, 123/32 C, 32 ST, 193 P

[56] References Cited

U.S. PATENT DOCUMENTS

| 3,302,627 | 2/1967 | Morris | 123/32 A |
| 3,374,773 | 3/1968 | Scherenberg | 123/32 C |
| 3,814,068 | 6/1974 | Kimbara et al. | 123/32 A |
| 3,872,841 | 3/1975 | Kimbara et al. | 123/32 ST |
| 3,892,221 | 7/1975 | Kimbara et al. | 123/32 ST |
| 3,945,351 | 3/1976 | Kimbara et al. | 123/32 ST |

FOREIGN PATENT DOCUMENTS

| 337682 | 5/1959 | Switzerland | 123/30 D |
| 341353 | 11/1959 | Switzerland | 123/30 D |

Primary Examiner—Charles J. Myhre
Assistant Examiner—Craig R. Feinberg
Attorney, Agent, or Firm—Armstrong, Nikaido, Marmelstein & Kubovcik

[57] ABSTRACT

A combustion chamber for an internal combustion engine of the direct injection type formed by a cylinder head, a cylinder liner and a piston head, the piston head having formed therein a cavity in which the air swirl can be produced by known device. A fuel injection nozzle is disposed substantially in the central part of said cavity for injecting jets of fuel radially against the cavity wall. Said cavity comprises an equilateral polygonal cavity formed in said piston head and a circular shaped cavity formed in the generally intermediate part of said equilateral polygonal cavity.

3 Claims, 3 Drawing Figures

COMBUSTION CHAMBER FOR AN INTERNAL COMBUSTION ENGINE OF DIRECT INJECTION TYPE

BACKGROUND OF THE INVENTION

This invention relates to a combustion chamber for internal combustion engines of the direct injection type, and more particularly to a combustion chamber which can reduce the level of noise (hereinafter referred to as the noise generated by combustion) and can also reduce the amount of nitrogen oxide (hereinafter referred to as NOx).

It is well known in the field of the art that in internal combustion engines if the timing of injection of fuel into the combustion chamber is delayed to some extent so as to reduce the explosion pressure and the rate of increase thereof the level of the noise generated by fuel combustion can be reduced and at the same time the combustion gas temperature can be lowered thereby reducing the amount of NOx.

However, there encounters a difficulty that in general when the timing of fuel injection is delayed the thermal efficiency of the Diesel cycle will be lowered so as to increase the fuel comsumption rate, and so imperfect combustion is caused thereby producing black exhaust gas or smoke.

Stated in brief, the fuel comsumption rate is a function of $dM/dt.S.Tm.Td.d\theta/dt$, and in the similar manner the color of exhaust gas, NOx, the noise generated by combustion are a function of $dM/dt.S.Tm.Td.d\theta/dt$, respectively.

A delay in injection timing serves to reduce an ignition lag Td, and therefore as a mean cycle gas temperature Tm and a heat generation coefficient $d\theta/dt$ are reduced the velocity of mixing fuel and air $dM/dt$ and the time and space distribution "S" of mixing ratio will be reduced.

Accordingly, if the timing of fuel injection is delayed the level of noise generated by fuel combustion and the amount of NOx can be reduced; however, the fuel consumption rate will be increased thereby generating black exhaust gas or smoke based on the above mentioned relationship.

In order to eliminate such difficulty it is only necessary to increase the air and fuel mixing speed $dM/dt$ at the time of delaying the fuel injection timing or increase the combustion speed after the fuel ignition. Stated more specifically, the emission of black exhaust gas and increase in fuel consumption rate are due to the fact that the combustion process is maintained even after the piston has reached its top dead centre, and so in order to eliminate the above-mentioned disadvantage, it is necessary to increase the combustion speed thereby shortening the combustion period.

In order to increase the combustion speed, it is required to increase the air flow (in particular, the air flow after the fuel ignition) within the combustion chamber.

The term "air flow" employed herein is meant by a large swirl motion generated in the combustion chamber and a resultant turbulence of a small scale.

To produce the above-mentioned air flow, there is conventionally provided a quadrilateral combustion chamber having a quadrilateral cavity formed in the upper part or top of a piston.

The combustion chamber of this form enables air turbulences of a small scale to be produced by a large air swirl motion in the corner square parts thereof so that a strong air flow can be produced therein.

However, the combustion chamber of such shape is disadvantageous in that the intensity of the turbulence of a small scale generated in the corner square parts and that of the large swirl are contrary to each other. In brief, if radius of the corner square parts is comparatively smaller than radius of the inscribed circle of the quadrilateral cavity, the intensity of air turbulences of a small scale generated in the corner square parts can be increased; therefore the intensity of the large air swirl motion will be reduced. If the ratio R/Ro is increased, the intensity of the large air swirl can be increased, whilst the air turbulence of a small scale generated in the corner square parts will be reduced.

In any case, the combustion chamber of the conventional shape cannot afford increased turbulences of a small scale and the large air swirl motion at the same time, and further the turbulences can be produced only in the corner square parts so that a sufficiently large air flow cannot be produced therein.

SUMMARY OF THE INVENTION

It is therefore an object of the present invention to provide a combustion chamber having an equilateral polygonal cavity and a circular shaped cavity formed in the piston head which is capable of producing a theoretical combustion process.

Another object of the present invention is to provide a combustion chamber which can produce an improved air flow therein by the action of air swirls produced in the equilateral polygonal cavity and in the circular shaped cavity.

In accordance with an aspect of the present invention, there is provided a combustion chamber for use in an internal combustion engine of the direct injection type which is defined by a cylinder head, a cylinder liner and a piston head, the piston head having formed therein a cavity in which the air swirl can be produced by known means. Said cavity comprises an equilateral polygonal cavity such as quadrilateral cavity formed in the piston head and a circular shaped cavity formed in the generally intermediate part of said equilateral polygonal cavity. A fuel injection nozzle is disposed substantially in the central part of said cavity for injecting jets of fuel radially against the cavity wall. Relatively low speed swirls are produced in the polygonal cavity even in the high engine speed region, while maintaining adequate swirl intensities in the low-speed region. A relatively high speed swirl is produced in the circular shaped cavity, on the other hand, in the high engine speed region thereby producing air turbulences between said swirls so as to produce an improved air flow in the combustion chamber.

The above and other objects, features and advantages of the present invention will be readily apparent from the following description taken in conjunction with the accompanying drawings.

DETAILED DESCRIPTION OF THE REFERRED EMBODIMENT

The present invention will now be described in detail below with reference to the accompanying drawings.

Figure 1:
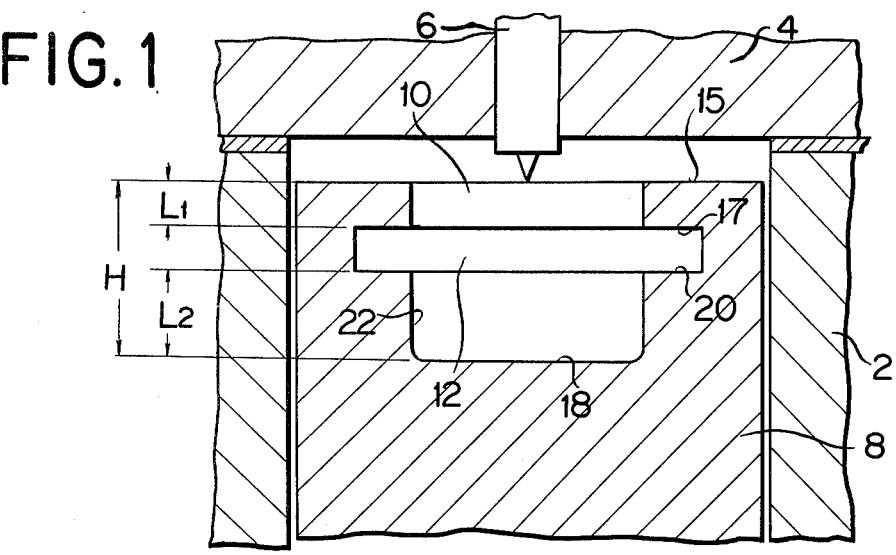
FIG. 1 is a sectional view of a combustion chamber according to the present invention.
Figure 2:
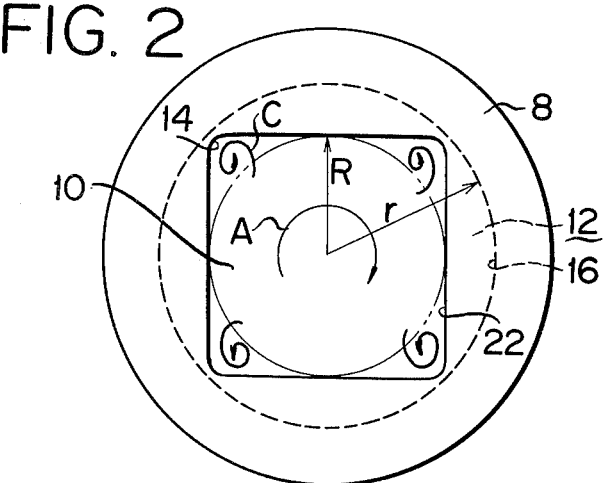
FIG. 2 is a plan view of the piston head of FIG. 1.

Referring to FIG. 1, reference numeral 2 denotes a cylinder liner, and 4 a cylinder head having a fuel injection nozzle 6 mounted in the approximately central part thereof. Reference numeral 8 represents a piston having a quadrilateral cavity 10 and a circular shaped cavity 12 formed in the generally intermediate part of the quadrilateral cavity 10. Rounded corners 14 of the quadrilateral cavity 10 are located inwards relative to the peripheral wall 16 of the circular shaped cavity 12. In order to attain good results, the ratio of the radius "r" of the circular shaped cavity 12 to the radius "R" of the inscribed circle of the quadrilateral cavity 12 is about 1.0 to 1.3 or $1.0 \leq r/R \leq 1.3$. The ratio of the distance $L_1$ between the upper surface 15 of the piston 8 and the upper wall 17 of the circular shaped cavity 12 to the depth H of the quadrilateral cavity 10 is about 0.2 to 0.4 or $0.2 \leq L_1/H \leq 0.4$; and the ratio of the distance $L_2$ between the bottom wall 18 of the quadrilateral cavity 10 and the lower wall 20 of the circular shaped cavity 12 to the depth H of the quadrilateral cavity 10 is about 0.3 to 0.7 or $0.3 \leq L_2/H \leq 0.7$. Therefore the inner walls 22 of the quadrilateral cavity 10 overhang relative to the inner peripheral wall 16 of the circular shaped cavity 12 by a dimension of "Z", which varies in the circumferencial direction.

Thus, swirls "A" are produced by a known means within the quadrilateral cavity 10 and a swirl "B" is produced within the circular shaped cavity 12. Further air turbulences "C" of a small scale are produced in rounded corner regions. Due to a strong friction occured between the swirls "A" and the inner walls 22 of the quadrilateral cavity 10, the swirl motion of the swirl "A" is reduced, so that the intensity of the swirl "B" within the circular shaped cavity 12 will become greater than that of the swirls "A".

Because there exists the swirls "A" with a reduced speed as well as the swirl "B" with a strong swirling motion, turbulences "D" due to shear flow are produced between the swirls "A" and the swirl "B". Further air turbulences "E" of a small scale may be produced adjacent to the boundary of the inner walls of the quadrilateral cavity 10 and the circular shaped cavity 12 by the influence of so-called "squish" produced when the piston 8 goes down. These turbulences of small scale will serve to enhance the combustion speed after ignition of the fuel. Since the amount of overhang "Z" varies in the circumferential direction, the intensities of turbulences "E" of a small scale vary circumferentially so that air flows in the combustion chamber become more complexed.

Figure 3:
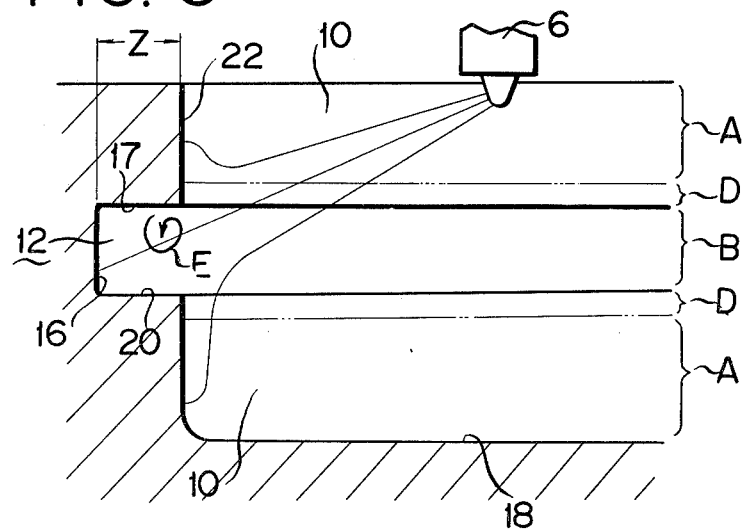
FIG. 3 is an explanatory view showing a behavior of mixing the fuel injected by the nozzle with air.

Since the fuel injection from the nozzle 6 is directed toward the cavity wall of the circular shaped cavity 12 as can be seen in FIG. 3, an excellent mixing of the fuel injected from the nozzle 6 with the air can be obtained.

Thus, various kinds of swirls and turbulences can be produced in the combustion chamber so as to improve air flow in it, and therefore the fuel combustion speed can be increased, and the fuel consumption rate can be reduced thereby eliminating generation of black exhaust gas as well as NOx.

What we claim is:

1. In an internal combustion engine of the direct injection type including combustion chambers each defined by a cylinder head, a cylinder liner and a piston head having a wall defining a cavity therein, means for producing air swirl in said cavity, and fuel injection means each having a plurality of fuel injection nozzles, said fuel injection means being mounted substantially at the central part of said cavity, said nozzles being arranged to inject jets of fuel into said cavity radially against said cavity wall, the improvement wherein said cavity wall is constructed to define a generally equilateral polygonal cavity formed in said piston head and a generally concentric circular shaped cavity formed in the generally intermediate part of the depth of said equilateral polygonal cavity.

2. The engine as defined in claim 1 wherein the ratio of the radius of said circular shaped cavity to that of the inscribed circle of said equilateral polygonal cavity is about 1.0 to 1.3 and wherein the ratio of the distance between the upper surface of said piston head and the upper wall of said circular shaped cavity to the depth of said equilateral polygonal cavity is about 0.2 to 0.4 and the ratio of the distance between the bottom wall of said equilateral polygonal cavity and the lower wall of said circular shaped cavity to the depth of said equilateral polygonal cavity is about 0.3 to 0.7.

3. The engine as defined in claim 1 wherein the fuel is injected against the peripheral wall of said circular shaped cavity.

* * * * *